Patented Jan. 7, 1941

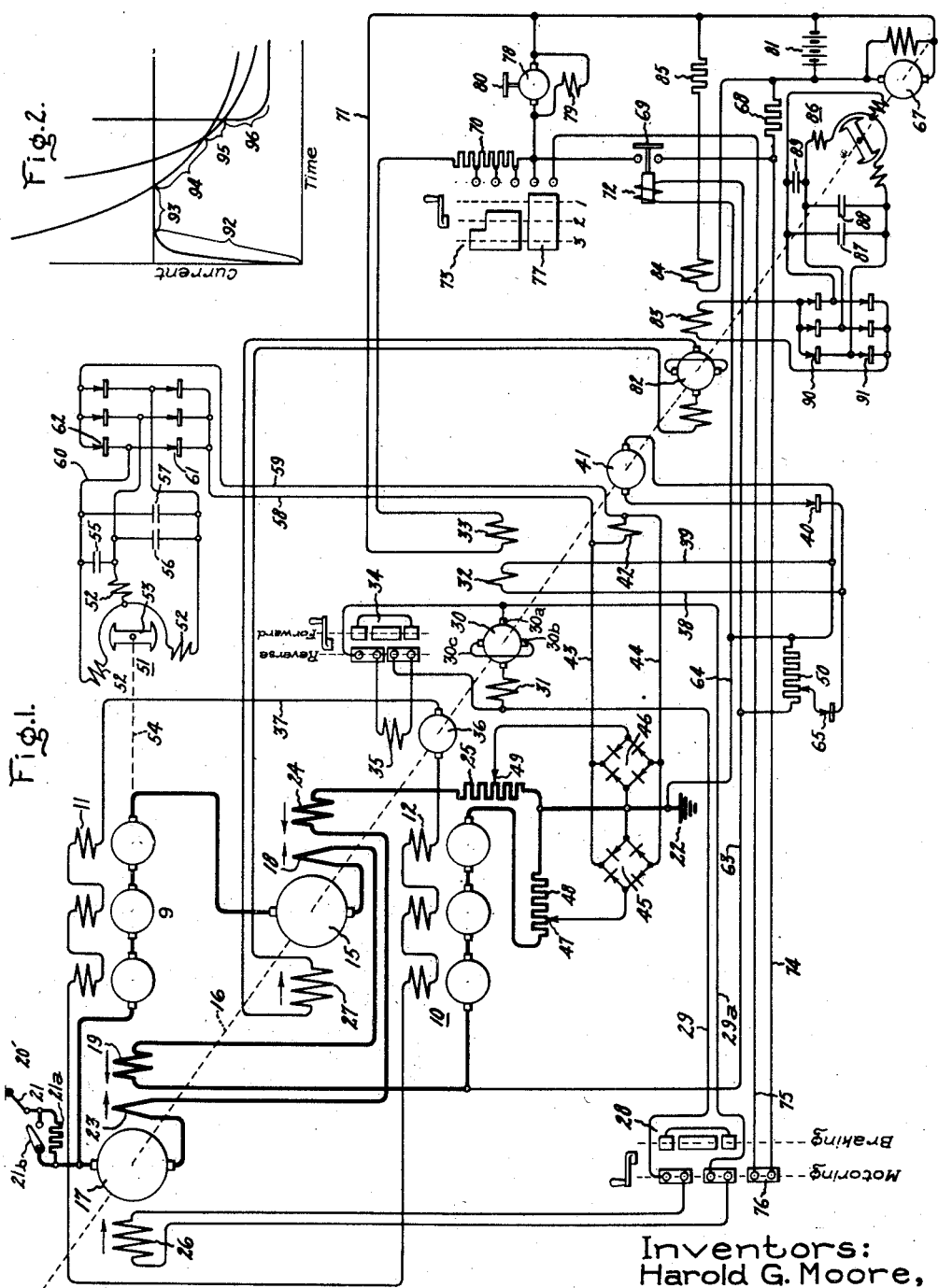

2,227,978

UNITED STATES PATENT OFFICE 2,227,978

MOTOR CONTROL SYSTEM

Harold G. Moore, Wesleyville, and Felix Konn, Erie, Pa., and Martin A. Edwards, Schenectady, N. Y., assignors to General Electric Company, a corporation of New York Application July 13, 1939, Serial No. 284,314

26 Claims. (Cl. 172—239)

Our invention relates to motor control systems, more particularly to systems for controlling motors which must be frequently started and stopped, such as the driving motors for electric vehicles, elevators, mill drives and the like, and has for its object a simple and reliable system providing controlled acceleration and controlled electric braking.

In carrying out our invention in one form we provide two direct current electric machines forming a set having their rotors mechanically connected together, and each operating interchangeably as a motor to drive the other machine as a generator in dependence upon the operating conditions. One of these machines, which may be called the line machine, is connected across the supply source, for example between a trolley conductor and ground. The other machine, which is a line buck or boost machine, is connected to the supply source in series with the armature or armatures of the motor or motors to be controlled.

Each of the machines of the set has a main exciting field winding connected in the armature circuit of the other machine. Each machine furthermore is provided with a series field winding acting in a direction to oppose current changes, thereby stabilizing the operation. Also each machine is provided with a third field winding which may oppose or aid its main exciting winding, and which is controlled from an outside source to modify the operation of the set.

We provide means for varying the controlled field windings of the set in such a way as to control the operation of the motors as desired.

One important feature of our invention is the excitation of the controlled winding of the line machine of this set in accordance with a plurality of operating variables so as to control the current supplied to the motors in accordance with these variables in such manner that the equipment gives at all times the maximum performance permitted by the operating restrictions and by the limiting characteristics of the electrical apparatus. We contemplate that the motor armature and field currents will be controlled in particular in accordance with a predetermined pattern of acceleration and in response to the rate of acceleration, the power transformed in the set, the voltage of the motor and the speed of the motor or the vehicle driven by it in such manner that the motor gives the maximum performance possible without exceeding predetermined limits set for each of these variables. We have also provided speed responsive means for varying the controlled winding of the buck or boost machine so as to maintain the speed of the set at a predetermined value by automatically adjusting the input of the set to its output.

For a more complete understanding of our invention, reference should be had to the accompanying drawing, Fig. 1 of which shows in diagrammatic form a system of traction motor control embodying our invention, while Fig. 2 shows various curves of operating characteristics.

Referring to the drawing, we have shown our invention in one form applied to the control of six traction motors having their armatures permanently connected in series with each other in two groups, 9 and 10, of three armatures each, each group having its exciting field windings 11 and 12 series connected with each other. The armatures of the two motor groups are in turn connected in series with each other in the circuit of a direct current dynamoelectric buck or boost machine 15 which has its rotor permanently connected by a shaft 16 directly to a similar direct current line machine 17. This motor armature circuit also includes a series winding 18 for the machine 15 and a main exciting winding 19 for the machine 17. More specifically, the motor circuit leads from a suitable source of direct current supply such as an overhead trolley wire 20 through a trolley 21, a starting resistance 21a for the set which is shorted by a switch 21b after the set has been started, the motor armatures 9, the armature of the buck or boost machine 15, field winding 18, field winding 19, the motor armatures 10, resistance 48 of low ohmic value serving for control purposes, to a return ground connection 22, it being assumed that the opposite side of the supply source connected to the trolley wire is likewise grounded.

The machine 17 is connected between the trolley 21 and the ground 22 with its own series winding 23 and the main exciting winding 24 for the machine 15 in circuit with it together with a resistance 25 of low ohmic value provided for control purposes.

The machine 17 is furthermore provided with a controlled separately excited field winding 26 which determines the output of the set, and the machine 15 is provided with a controlled separately excited field winding 27 which adjusts the input to the set. As indicated by the small arrows, these controlled windings normally oppose the exciting windings 19 and 24 on the machines. The series field windings 23 and 18 normally oppose any tendency of the current to change in the corresponding armatures 17 and 15 and thereby have a stabilizing effect preventing violent energy oscillations.

In operation one of the machines 15 and 17 acts as a motor to drive the other as a generator. The general law of operation is that the field winding 19 and, consequently, the traction motors 9 and 10, are supplied automatically with enough current so that the induced voltage of the machine 17 will differ from the line voltage only by the resistance voltage drop. The amount of this traction motor current depends upon the amount and direction of energization of the field winding 26. Since for constant speed operation of the set its energy input must be equal to its energy output, except for the losses in the set, the winding 27 in the buck or boost machine 15 is energized to modify the current in the line machine 17 so as to adjust the input of the line machine to be equal to the output of the buck or boost machine plus the losses. This maintains constant the speed of the set.

Energization of the field winding 26 in opposition to 19 automatically increases the current in field winding 10 to maintain the required voltage across the machine 17.

Reversing the field winding 26 to energize it in the same direction as the field winding 19 decreases the current in the field winding 19. The current in the field winding 19 may thus be decreased to zero and then, if the current in field winding 26 is still further increased, the current in field winding 19 reverses which gives regenerative braking of the motors.

With zero voltage across the traction motors and idling current in the traction motors, the field widing 26 is deenergized and the field winding 19 is automatically supplied with a current sufficient to maintain the voltage of the machine 17, operating as a generator, equal to the line voltage. The current in the machine 17 and the field winding 24 is of such value as to supply the idling losses in all the apparatus shown in Fig. 1, with the set running at its normal predetermined speed, the voltage across the machine 15 being substantially equal, but in opposition to the line voltage.

The traction motors are now started by energizing the field winding 26 in opposition to the field winding 19. This reduces the current initially in the field winding 24. The voltage of the machine 15 is thereby reduced and the line voltage forces an increased amount of current through the traction motors and the field winding 19 to reestablish a balanced condition. At this time the machine 15 acts as a motor. The current in the traction motors during acceleration is thus controlled by the excitation of winding 26.

As the equipment accelerates the voltage of the machine 15 becomes zero at which time full line voltage is applied to the traction motors. At this time the only current flowing in the machine 17 and winding 24 is the current required to overcome the losses. Then, as the traction motors are further accelerated, the voltage across the terminals of the machine 15 is reversed by further speed responsive increase of the excitation of field winding 27 to give a voltage in the same direction as the line voltage whereby the required current in the field winding 19 is maintained, the machine 15 then acting as a generator. In this way a voltage may be applied to the motors which is double the line voltage or more.

In order to achieve a complete utilization of the equipment throughout its working range, we furthermore provide means for controlling the excitation of the field winding 26 in turn in accordance with each of the following operating variables: the traction motor current which is a measure of the rate of acceleration of the motors, the line machine current which is a measure of the power transformed in the set, the voltage of the motors, and the speed of the vehicle in such manner that the equipment operates to deliver the maximum performance consistent with predetermined limits set for these operating variables. In addition, when the equipment starts from rest or comes to a stop, the field winding 26 is controlled in accordance with a predetermined pattern of acceleration or deceleration.

As shown, the field winding 26 is connected through a suitable reversing controller 28, and by means of conductors 29 and 29a, across the terminals of a direct current exciting generator 30 of the type described and claimed in a copending application of Ernst F. W. Alexanderson and Martin A. Edwards S. N. 281,008 filed June 24, 1939, assigned to the same assignee as this application. This exciter has a pair or set of current supply brushes 30a and a second pair or set of brushes 30b which are short circuited through a conductor 30c and which are in quadrature relation with the current supply brushes 30a. Also it is provided with a series compensating winding 31 which substantially neutralizes its armature reaction along its current supply brushes 30a. One of the desirable characteristics of this exciter is that its voltage responds very quickly with very high amplification factor to any change in the excitation of its two separately excited field windings 32 and 33. The exciter 30 also supplies current through a suitable motor reversing switch 34 to a field winding 35 for a direct current exciter 36 which is connected through a conductor 37 to supply current to the motor exciting field windings 11 and 12 in series with each other. The two exciters 30 and 36 are driven from the common shaft 16 for the machines 15 and 17, and as shown are directly connected to this shaft.

The field winding 32 is in turn connected through the conductors 38 and 39 and an electric valve or one-way rectifier 40, which is preferably a copper oxide rectifier, to a third exciter 41. The rectifier 40 is connected to prevent the flow of reversed current through the exciter 41 from a potentiometer resistor 50. A field winding 42 is provided for this exciter which field winding is connected through conductors 43 and 44 across the terminals of two electric valve means or blocking rectifier assemblies 45 and 46. Each of these assemblies consists of four rectifiers, preferably copper oxide rectifiers, which are connected in the four-legged conventional full-wave rectifier circuit. These two sets of rectifiers function, however, to supply current to the field winding 42 in response to the greater of two voltages applied to them.

As shown, the rectifier assembly 45 has one terminal connected to an adjustable tap 47 on the series resistance 48. Thus the rectifier 45 is supplied with a voltage which is proportional to the current supplied to the motors, which current is proportional to the rate of acceleration of the vehicle.

In a manner similar to the rectifier assembly 45, the rectifier 46 is connected across the resistance 25, a suitable movable tap 49 being provided on the resistance. The voltage across the resistance 25 is of course directly proportional to the current in the resistance and this current, which is the current in the line machine 17, is proportional to the power or kilowatts converted in the set.

Excitation for the field winding 42 is also supplied from a source responsive to the speed of the vehicle as measured by one or more of the traction motors. This speed responsive means comprises a three-phase generator 51 having a three-phase Y connected stator winding 52, and a rotor 53 which does not have a winding and which is connected to be driven in accordance with the speed of the vehicle, as shown, direct connected through a suitable shaft 54 to one of the motors 9. The rotor 53 need not be a permanent magnet. It preferably is made of magnet core iron and it must have some residual magnetism to cause the generator to build up. Across the terminals of the three-phase winding 52 are connected respectively condensers 55, 56 and 57 which condensers are of such size as to provide tuned circuits through the winding 52 at a predetermined frequency which corresponds to a predetermined speed of the rotor 53. Each terminal of the winding 52 is connected through two rectifiers, preferably copper oxide rectifiers, to the two conductors 58 and 59 leading to the terminals of the field winding 42, the two rectifiers being oppositely connected for full wave rectification. For example, the terminal 60 is connected through the two rectifiers 61 and 62 respectively to the conductors 58 and 59.

In the operation of the speed responsive generator 51, when the speed of the rotor 53 is below the speed for which the circuits of the winding 52 are tuned by the condensers, very small currents flow through the winding 52 and, consequently, the voltage across the condensers are very low and no current is supplied by the generator to the field winding 42. When the tuned frequency is reached, however, the voltages across the condensers 55, 56, and 57 increase very rapidly with consequent rapid increase in the current supplied to the field winding 42 after this voltage becomes greater than the voltage supplied by the rectifier groups 45 and 46. This gives great sensitivity of control.

Excitation current is supplied to the field winding 42 from the rectifier 45, the rectifier 46 or the speed responsive generator 51 in dependence upon which one of the three delivers the highest voltage. The taps 47 and 49 are suitably adjusted to give the proper relative importance to these operating variables. In the acceleration of the motors, the motor current will reach its predetermined maximum value first and the rectifier 45 will then supply current to the field winding 42 which causes the exciter 41 to increase the excitation of the exciter field winding 32 which winding opposes the main exciter winding 33 and thereby limits or reduces the excitation current supplied to the field windings 26 and 35 so as to maintain the motor current at this maximum value. As the acceleration continues, the current in the line machine 17, i. e., the power transformed in the set, reaches a predetermined limiting value and the rectifier 46 then increases the excitation of the field winding 42 to still further limit the excitation of the field windings 26 and 35. Later on, the traction motor speed reaches its predetermined maximum and then the generator 51 increases the excitation of the field winding 42 to limit the motor speed.

Excitation responsive to the voltage of the traction motors is supplied to the field winding 32 by means of the potentiometer resistor 50 which is connected through conductors 63 and 64 across the armatures 10. A blocking rectifier 65, preferably of the copper oxide type, is connected between the resistance 50 and the field winding 32 for the purpose of preventing reverse current flow through resistor 50 from exciter 41. Thus when the voltage signal from the resistor 50 is greater than the voltage generated by the exciter 41, current passes through the rectifier 65, thence through the conductor 38, field winding 32 and back through the conductor 39 to the motor terminals. In the event the exciter 41 voltage is higher, the exciter supplies current to the field winding, the rectifier 65 preventing reverse current flow to resistor 50.

Thus, it will be seen that the field winding 32 is excited by the exciter 41 in response to traction motor current, power transformed in the set, or traction motor speed, or directly from the motor terminals through the rectifier 65, in dependence upon which one of these variables gives the predominant signal.

The field winding 33 for the exciter 30 is energized from a battery-charging generator 67 connected to be driven from the shaft 16. The circuit from the generator 67 leads through a resistance 68, an electromagnetically operated switch 69, a resistance 70, through the field winding 33 and back through the conductor 71 to the other side of the generator 67. The normally open switch 69 is closed by a coil 72 which is connected through the conductors 63 and 64 across the motors 10. Consequently when the motors are started, this switch 69 is open but it is by-passed by conductors 74 and 75 and fingers 76 and 77 when the motoring connection is established by turning the manually-operated controller 73 to one of its operating positions while of course the controller 28 is in the motoring position. Consequently, in starting, the circuit for the field winding 33 leads from the generator 67 through the resistance 68, the conductor 74, the contact 76 of the controller 28, the conductor 75, the contact segment 77 of the controller 73 and thence through the resistance 70 as previously described.

For the purpose of introducing a predetermined pattern of acceleration into the excitation of the field winding 33 a small motor 78, provided with a field winding 79, is connected across the circuit. This motor drives a suitable flywheel 80. When the controller 73 which controls the acceleration and deceleration of the traction motors is first turned to a running position, the current through the motor 78 produces a voltage drop across the permanent resistance 68 in the circuit which voltage correspondingly decreases the voltage available across the resistance 70 and the field winding 33. This consequent reduced excitation of the field winding 33 gives a correspondingly reduced excitation of the field winding 26 whereby the current supplied to the traction motors is limited and their acceleration thereby limited. As the motor 78 increases in speed, its current decreases and the voltage available for the field winding 33 is thereby increased. The motor 78 and the flywheel 80 will be so selected with respect to each other and the characteristics of the supply circuit for the field winding 33 that the motor 78 will accelerate at a rate corresponding to the desired pattern of acceleration for the traction motors and the vehicle will follow this pattern of acceleration by reason of the increased excitation of the field winding 33.

When the traction motor voltage has reached a predetermined value, the coil 72 is sufficiently energized to close the switch 69, but this introduces no change in the motoring operation. The motor 78 continues to operate and drive the flywheel 80 at full speed. For the purpose of giving a uniform exciting voltage from the generator 67 irrespective of small changes in speed of the generator inherent in the speed regulator, a suitable storage battery 81 is connected across the generator 67.

It is necessary that during the operation of the equipment, the set be running continuously at essentially constant speed and to that end means are provided for automatically regulating the excitation of winding 27 to maintain a balance between input energy to, and output energy of, the set allowing for a net difference to supply the losses in the set for the speed at which it is operated. For very sensitive excitation response to the speed of the set, the field winding 27 is connected to an exciter 82 which is similar in construction and operation to the exciter 30. This exciter 82 has two field windings 83 and 84, the winding 84 being connected through a resistor 85 across the storage battery 81 so as to be supplied with a constant excitation.

The other winding 83 is excited from a speed responsive generator 86 which is preferably similar in construction to the generator 51, having its rotor driven from the shaft 16 of the set. This generator has its three-phase Y connected stator winding connected across condensers 87, 88 and 89 and connected to supply current through the rectifiers 90 and 91 to the field winding 83 in the manner hereinbefore described in connection with the generator 51.

The normal running speed of the rotor of the generator 86 which is driven by the set is slightly below the tuned speed of the generator circuits so that the generator normally supplies an exciting current to the field winding 83 to oppose and neutralize the excitation of the winding 84 for stable conditions. When, for any reason, the speed of the set and consequently the speed of the generator rotor changes as would be caused by a change in the traction motor load, the current supplied to the field winding 83 changes very rapidly and with corresponding rapidity provides a net excitation for the exciter 82 in one or the other sense. For example, in case the speed of the set decreases, the excitation of the field winding 83 decreases very rapidly with the result that it offers less opposition to the field winding 84 and consequently, the voltage of the exciter 82 increases and increases the excitation of the field winding 27 so as to increase the speed of the set. For this particular condition, the speed will be stabilized at a value slightly less than the former speed of the set. In a similar manner, an increase in the speed of the set above a predetermined speed is offset and the speed stabilized somewhat higher than the normal speed. These slight changes in the regulated speed are necessary to produce the continuous and automatic corrective action required to keep the set running at a substantially constant speed in spite of fluctuating line voltage and operating conditions.

In contrast to the automatic means for the control of the field winding 27 assuring operation of the set at a substantially constant speed, means are provided for manually selecting anyone of several available accelerating and decelerating performance characteristics as indicated advisable by operating conditions. This selection is afforded by the controller 73 which provides three operating positions and an "off" position, the operating positions controlling the amount of the resistance 70 included in circuit with the field winding 33.

Let us assume that in starting the motors the controller 73 is brought to the third or maximum performance position, in which nearly all of the resistance 70 is short circuited. During an initial or first period the motor current is limited by the excitation of the field winding 33 which in turn is restricted by the current demand for the acceleration of the flywheel motor 78, as indicated by the curve 92 of Fig. 2. Full voltage is made available to the field winding 33 when the motor 78 reaches full speed. Therefore, the value of the traction motor current will, during this first period of acceleration, follow the pattern set up by the excitation of the field winding 33.

Of the plurality of signals provided, the one from the rectifier 45 corresponding to the traction motor current, proportional to the rate of acceleration, is the one signal which is limiting in the second phase of acceleration, indicated by the horizontal line curve 93 of Fig. 2.

As the equipment accelerates, the signal produced by the rectifier 46 measuring the line machine current, i. e., the power transformed in the set, exceeds that produced by the rectifier 45 and becomes limiting during the third phase of acceleration, indicated by the curve 94 of Fig. 2. The action of the exciter 30 to control the amount of power transformed in the set in response to the signal from 46 reduces the current of the traction motors which reduces the signal from 45 below the value maintained by 46.

As the equipment accelerates further, the signal produced by 50, measuring the traction motor voltage, exceeds that produced by either 45 or 46 and becomes limiting during the fourth phase of acceleration as indicated by the curve 95 of Fig. 2. The action of the exciter 30 to control the amount of power transformed in the set in response to the signal from 50 reduces the current in the line machine which reduces the signal from 46 below the value maintained by 50 and further reduces the current in the traction motors and the signal from 45.

As the equipment attains its predetermined maximum permissible speed, the signal produced by the generator 51, measuring the speed of the traction motors, exceeds that produced by either 45, 46 or 50 and becomes limiting during the fifth and final phase of acceleration, as indicated by the curve 96 of Fig. 2. The action of the exciter 30 to control the amount of power transformed in the set in response to the signal from the generator 51 reduces the voltage on the traction motors which reduces the signal from 50 below the value maintained by the generator 51 and further reduces the current in the traction motors and in the line machine and the signals from 45 and 46.

For coasting, the controller 73 is brought back to the "off" position. For braking, while the controller 73 is in the "off" position, the controller 28 is changed from motoring to braking, after which the controller 73 is brought to the position corresponding to the desired pattern of deceleration.

The same phases which were described for acceleration of the equipment will be repeated in reverse order throughout the braking cycle until at very low speeds, the voltage of the traction motors is reduced to a low value which will cause the contact 69 to open. Since, in braking operation the contact 76 is open, this disconnects the winding 33 and motor 78 from the battery voltage. The motor 78 now operates as shunt-excited generator and supplies a gradually decreasing voltage to the field winding 33 as the motor 78 slows down which results in a smooth reduction in braking effort down to zero. When the motor 78 comes to rest at approximately the same time that the motors 9 and 10 come to a standstill, the winding 33 is no longer excited and the controller 73 may be brought back to the "off" position.

When the controller 73 is in the "off" position with the braking connections established, a low rate of regenerative braking is provided since the entire resistance 70 is then in circuit with the field winding 33.

A distinguishing feature of this regenerative braking is that the regenerative braking continues until the motors are brought substantially to a standstill.

In the braking operation, the flywheel motor 78 takes control only after the motors have been decelerated to a low speed, such as 5 M. P. H., at which the coil 72 is deenergized sufficiently for the switch 69 to open. This disconnects the battery 81 from the flywheel motor 78 which thereupon decelerates at its inherent rate and causes the motors to decelerate at a corresponding rate.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States, is:

1. The combination in a system of motor control, of a direct current line machine, a direct current buck or boost machine mechanically connected to said line machine, a main exciting field winding for said line machine connected in circuit with said buck or boost machine, a main exciting field winding for said buck or boost machine connected in circuit with said line machine, connections for connecting a source of direct current supply to said machines, connections for connecting a motor to be controlled in circuit with said buck or boost machine, a controlled field winding for said line machine, means responsive to an operating condition of said motor for controlling said controlled field winding, a second controlled field winding for said buck or boost machine, and means responsive to the speed of said machines for controlling the excitation of said second controlled field winding so as to maintain the speed of said machines substantially at a predetermined value.

2. The combination in a system of motor control, of a line machine, a buck or boost machine mechanically connected to said line machine, a main exciting field winding for said line machine connected in series with said buck or boost machine, a main exciting field winding for said buck or boost machine connected in series with said line machine, connections for connecting a source of direct current supply to said machines, connections for connecting a motor to be controlled in circuit with said buck or boost machine, a controlled field winding for said line machine, means responsive to a plurality of variable operating conditions of the motor and of said machines for controlling said controlled field winding to limit said variables to predetermined maximum values, a second controlled field winding for said buck or boost machine, and means responsive to the speed of said machines for controlling the excitation of said second controlled field winding so as to maintain the speed of said machines substantially at a predetermined value.

3. The combination in a system of motor control, of a line machine, a buck or boost machine mechanically connected to said line machine, a main exciting field winding for said line machine connected in circuit with said buck or boost machine, a main exciting field winding for said buck or boost machine connected in circuit with said line machine, connections for connecting a source of direct current supply to said machines, a motor to be controlled connected in circuit with said buck or boost machine, a controlled field winding for said line machine, means responsive to variable operating conditions of said motor including current and voltage for controlling said controlled field winding to limit said variables to predetermined maximum values, means responsive to a predetermined pattern of acceleration for controlling said controlled field winding, a second controlled field winding for said buck or boost machine, means responsive to the speed of said machines for controlling the excitation of said second controlled field winding so as to maintain the speed of said machines substantially at a predetermined value, and means for exciting a field winding for said motor in accordance with the excitation of said first controlled field winding.

4. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, connections for connecting a motor to be controlled in circuit with said buck or boost machine, a controlled field winding for said line machine, means for varying the excitation of said controlled field winding thereby to control the motor, and means for reversing said controlled field winding to give regenerative braking of the motor.

5. The combination in a system of motor control of a line machine, a buck or boost machine mechanically connected to said line machine, a main exciting field winding for said line machine connected in series with said buck or boost machine, a main exciting field winding for said buck or boost machine connected in series with said line machine, connections for connecting a source of direct current supply to said machines, connections for connecting a motor to be controlled in circuit with said buck or boost machine, a controlled field winding for said line machine, means responsive to operating conditions of the motor for varying the excitation of said controlled field winding, and means for reversing said controlled field winding to give regenerative braking of the motor.

6. The combination in a system of motor control of a line machine, a buck or boost machine mechanically connected to said line machine, a main exciting field winding for said line machine connected in series with said buck or boost machine, a main exciting field winding for said buck or boost machine connected in series with said line machine, connections for connecting a source of direct current supply to said machines, connections for connecting a motor to be controlled in circuit with said buck or boost machine, a controlled field winding for said line machine, means for varying the energization of said controlled field winding to accelerate said motor, means for reversing said controlled field winding to give regenerative braking of the motor, a controlled field winding for said buck or boost machine, and means responsive to the speed of said machines for varying the energization of said last-mentioned controlled field winding thereby to maintain the speed of said machines substantially constant.

7. The combination in a system of motor control of a line machine, a buck or boost machine mechanically connected to said line machine, a main exciting field winding for said line machine connected in series with said buck or boost machine, a main exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding on said exciter for substantially neutralizing the armature reaction of said exciter along said current supply brushes, and means for controlling said exciter to accelerate said motor.

8. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding on said exciter for substantially neutralizing the armature reaction of said exciter along said current supply brushes, and means responsive to a plurality of variable operating conditions of the motor and of said machines for controlling said exciter.

9. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing the armature reaction along said current supply brushes, an exciting field winding for said exciter, and means responsive to the current in said line machine, the current in said buck or boost machine, the voltage of said motor and the speed of said motor for energizing said exciting field winding selectively to limit the operation of said motor.

10. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, means responsive to operating conditions of said machines and said motor for energizing said exciting field winding selectively to limit the operation of said motor, and means for reversing said controlled field winding of said line machine to give regenerative braking of said motor.

11. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing the armature reaction along said current supply brushes, an exciting field winding for said exciter, means responsive to the current in said line machine, the current in said buck or boost machine, the voltage of said motor and the speed of said motor for energizing said exciting field winding selectively to limit the operation of said motor, a second exciting field winding for said exciter, and connections for energizing said second exciting field winding in opposition to said first exciting field winding.

12. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing the armature reaction along said current supply brushes, an exciting field winding for said exciter, connections for energizing said exciting field winding, and means responsive to a predetermined pattern of acceleration for controlling the energization of said exciting field winding to control thereby the rate of acceleration of said motor.

13. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing the armature reaction along said current supply brushes, an exciting field winding for said exciter, means for controlling said exciting field winding, a second exciting field winding for said exciter, connections for energizing said second field winding from a substantially constant voltage supply source in opposition to said first field winding, and means responsive to a predetermined pattern of acceleration for controlling the energization of said second field winding to control thereby the rate of acceleration of said motor.

14. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, means responsive to the current in said line machine, the current in said buck or boost machine, the voltage of said motor and the speed of said motor for energizing said exciting field winding selectively to limit the operation of said motor, a second exciting field winding for said exciter, connections for energizing said second exciting field winding from a substantially constant voltage supply source in opposition to said first exciting field winding, and means responsive to a predetermined pattern of acceleration for controlling the energization of said second field winding to control thereby the rate of acceleration of said motor.

15. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, connections for energizing said exciting field winding from a supply source, a resistance connected in circuit with said exciting field winding, and a flywheel motor connected across said exciting field winding for varying during its acceleration the voltage across said exciting field winding thereby to control the acceleration of said motor.

16. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, a direct current exciter for said controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding, means responsive to a plurality of variable operating conditions of the motor and of said machines for controlling said exciting field winding selectively to limit the operation of said motor, a second exciting field winding for said exciter, connections for energizing said second exciting field winding in opposition to said first exciting field winding, a resistance connected in circuit with said second exciting field winding, and a flywheel motor connected across said second exciting field winding for varying during its acceleration the voltage across said second exciting field winding thereby to control the acceleration of said motor.

17. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, connections for connecting a motor to be controlled in circuit with said buck or boost machine, a controlled field winding for said line machine, means responsive to operating conditions of the motor and of said machines for controlling said controlled field winding, said means including resistances in circuit with said line machine and said buck or boost machine, a generator driven by said motor and current valve means for varying the energization of said controlled field winding in response to the voltages across said resistances and said generator.

18. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, connections for connecting a motor to be controlled in circuit with said buck or boost machine, a controlled field winding for said line machine, means responsive to a plurality of variable operating conditions of the motor and of said machines for controlling said controlled field winding, said means including resistances in circuit with said line machine and said buck or boost machine, a generator driven by said motor, current rectifiers for varying the energization of said controlled field winding in response to the voltages across said resistances and said generator, and means for reversing said controlled field winding of said line machine to give regenerative braking of the motor.

19. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a separately excited field winding for said motor, an exciter for said controlled field winding and said motor field winding, a field winding for said exciter, means responsive to the current in said line machine, the current in said buck or boost machine, the voltage of said motor and the speed of said motor for energizing said exciter field winding selectively to limit the operation of said motor, said means including resistances in circuit with said line machine and said buck or boost machine, a generator driven by said motor, and current valve means for varying the energization of said exciter field winding in response to the voltages across said resistances and said generator.

20. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, connections for connecting a motor to be controlled in circuit with said buck or boost machine, a controlled field winding for said line machine, means for varying said controlled field winding, a second controlled field winding for said buck or boost machine, a direct current exciter for said controlled field winding of said buck or boost machine, said exciter being provided with a set of current supply brushes and with a set of short circuited quadrature brushes, a compensating series field winding for said exciter for substantially neutralizing its armature reaction in the direction of said current supply brushes, an exciting field winding for said exciter, connections for energizing said exciting field winding from a substantially constant voltage source of supply, a second exciting field winding for said exciter, a pilot generator driven by said machines, and current valve means connected to said pilot generator for energizing said second exciting field winding in opposition to said first exciting field winding so as to maintain the speed of said machines at a substantially constant value.

21. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, connections for connecting a motor to be controlled in circuit with said buck or boost machine, a controlled field winding for said line machine, a direct current exciter for the controlled field winding of said line machine, said exciter being provided with a set of current supply brushes and with a set of short circuited quadrature brushes, a compensating series field winding for said exciter for substantially neutralizing its armature reaction along said current supply brushes, an exciting field winding for said exciter, a resistance in series with said exciting field winding, and controller means for varying said resistance to vary the excitation of said exciting field winding.

22. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor to be controlled connected in circuit with said buck or boost machine, a controlled field winding for said line machine, a separately excited field winding for said motor, a direct current exciter for the controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, means responsive to the current in said line machine, the current in said buck or boost machine, the voltage of said motor and the speed of said motor for energizing said exciting field winding selectively to limit the operation of said motor, a second exciting field winding for said exciter, connections for energizing said second exciting field winding from a substantially constant voltage supply source in opposition to said first exciting field winding, a resistance in series with said second exciting field winding, and controller means for varying said resistance to vary the excitation of said second exciting field winding.

23. The combination in a system of motor control of a line machine, a buck or boost machine mechanically connected to said line machine, a main exciting field winding for said line machine connected in series with said buck or boost machine, a main exciting field winding for said buck or boost machine connected in series with said line machine, connections for connecting a source of direct current supply to said machines, a driving motor connected in circuit with said buck or boost machine, a controlled field winding for said line machine, means responsive to a plurality of variable operating conditions of the motor and of said machines for controlling said controlled field winding, a separately excited field winding for said driving motor, excitation means for the controlled field winding of said line machine and said driving motor field winding, a flywheel motor, connections for energizing said excitation means and said flywheel motor from a substantially constant voltage source of supply, a switch in series with said excitation means and said flywheel motor, and means responsive to the voltage across said driving motor for controlling said switch whereby said switch is caused to open in response to predetermined minimum voltage across said driving motor to disconnect said excitation means and said flywheel motor from their source of supply whereupon said excitation means is energized from said flywheel motor functioning as generator to control the deceleration of said driving motor.

24. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a driving motor connected in circuit with the buck or boost machine, a controlled field winding for said line machine, means for controlling said controlled field winding, a separately excited field winding for said driving motor, a direct current exciter for the controlled field winding of said line machine and said driving motor field winding, said exciter being provided with a set of current supply brushes and with a set of short circuited quadrature brushes, a compensating series field winding for substantially neutralizing its armature reaction along said current supply brushes, an exciting field winding for said exciter, a flywheel motor, connections for energizing said exciting field winding and said flywheel motor from a substantially constant voltage supply source, a switch in series with said exciting field winding, means responsive to the voltage across said driving motor for controlling said switch whereby said switch is caused to open in response to a predetermined minimum voltage across said driving motor to disconnect said exciting field winding and said flywheel motor from their source of supply whereupon said exciting field winding is energized from said flywheel motor functioning as generator to control the deceleration of said motor.

25. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a driving motor connected in circuit with said buck or boost machine, a controlled field winding for said line machine, a separately excited field winding for said driving motor, a direct current exciter for the controlled field winding of said line machine and said driving motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, means responsive to the current in said line machine, the current in said buck or boost machine, the voltage of said driving motor and the speed of said motor for energizing said exciting field winding selectively to limit the operation of said motor, a second exciting field winding for said exciter, a flywheel motor, connections for energizing said second exciting field winding and said flywheel motor from a substantially constant voltage supply source in opposition to said first exciting field winding, a switch in series with said second exciting field winding and said flywheel motor, means responsive to the voltage of said driving motor for controlling said switch whereby said switch is caused to open in response to a predetermined minimum voltage across said driving motor to disconnect said second exciting field winding and said flywheel motor from their source of supply whereupon said second exciting field winding is energized from said flywheel motor functioning as generator to control the deceleration of said driving motor.

26. The combination in a system of motor control of a line machine, a buck or boost machine mechanically connected to said line machine, an exciting field winding for said line machine connected in series with said buck or boost machine, an exciting field winding for said buck or boost machine connected in series with said line machine, connections for connecting a source of direct current supply to said machines, a motor connected in circuit with said buck or boost machine, a controlled field winding for said line machine, a second controlled field winding for said buck or boost machine, a direct current exciter for said controlled field winding of said line machine and said motor field winding, said exciter being provided with a set of current supply brushes and with a set of short circuited quadrature brushes, a compensating series field winding for said exciter for substantially neutralizing its armature reaction along said current supply brushes, an exciting field winding for said exciter, means for controlling said exciting field winding, a second direct current exciter for the controlled field winding of said buck or boost machine, said second exciter being provided with a set of current supply brushes and with a set of short circuited quadrature brushes, a compensating series field winding for substantially neutralizing the armature reaction of said second exciter along its current supply brushes, a second exciting field winding for said second exciter, connections for energizing said second exciting field winding from a substantially constant voltage source of supply, an opposing exciting field winding for said second exciter, a pilot generator driven by said machines, and current rectifiers connected to said pilot generator for energizing said opposing exciting field winding in opposition to said second exciting field winding so as to maintain the speed of said machines at a substantially constant value.

HAROLD G. MOORE.
FELIX KONN.
MARTIN A. EDWARDS.